US009085469B2

(12) United States Patent
Banerjee et al.

(10) Patent No.: US 9,085,469 B2
(45) Date of Patent: Jul. 21, 2015

(54) PROCESS FOR REDUCING PERCHLORATE IN WATER

(75) Inventors: Kashi Banerjee, Moon Township, PA (US); Charles D. Blumenschein, Pittsburgh, PA (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 875 days.

(21) Appl. No.: 13/157,896

(22) Filed: Jun. 10, 2011

(65) Prior Publication Data

US 2012/0312746 A1 Dec. 13, 2012

(51) Int. Cl.
| B01D 11/04 | (2006.01) |
| C02F 1/00 | (2006.01) |
| C02F 1/70 | (2006.01) |
| C02F 101/12 | (2006.01) |
| C02F 101/36 | (2006.01) |

(52) U.S. Cl.
CPC . C02F 1/001 (2013.01); C02F 1/70 (2013.01); C02F 2101/12 (2013.01); C02F 2101/36 (2013.01); C02F 2209/06 (2013.01); C02F 2303/16 (2013.01)

(58) Field of Classification Search
None
See application file for complete search history.

(56) References Cited

U.S. PATENT DOCUMENTS

| 6,113,797 A * | 9/2000 | Al-Samadi | 210/652 |
| 6,358,396 B1 * | 3/2002 | Gu et al. | 205/704 |

OTHER PUBLICATIONS

Yee et al., 2009, Desalination, 236, 216-223, Effects of recycle ratios on process dynamics.*
Wang et al. 2010, Journal of Hazardous Materials, 175, 159-164.*
Hurley, 2002, Dissertation, Heterogeneous Catalytic Reduction of Perchlorate in Water.*
Srinivasan, 2009, Separation and Purification Technology, 69, 7-21.*
"Perchlorate", 2008, The Interstate Technology and Regulatory Council Perchlorate Team, Remediation Technologies for Perchlorate Contamination in Water and Soil.*
Schlesinger et al., 1952, Sodium Borohydride, Its Hydrolysis and its Use as a Reducing Agent and in the Generation of Hydrogen.*
Chang et al., 2008, 138, Removal of perchlorate in ammunition wastewater by zero-valent iron and perchlorate respiring bacteria.*
Park, 2010, Dissertation, Perchlorate Degradation Using Partially Oxidized Titanium Ions and Ion Exhcnage Membrane Hybrid System.*
Markowitz et al., The Differential Thermal Analysis of Perchlorates. VII. Catalyic Decompositions of the Alkali Metal Perchlorates by Manganese Dioxide, 1964, Foote Mineral Company and Engineering Center, Ezton, Pennsylvania.*

* cited by examiner

Primary Examiner — Allison Fitzsimmons
(74) Attorney, Agent, or Firm — Coats and Bennett, PLLC (57) ABSTRACT

A method or process for removing perchlorate ions from water includes mixing water containing perchlorate ions with a reducing agent such that the perchlorate ions and the reducing agent undergo an oxidation-reduction reaction. During the oxidation-reduction reaction, perchlorate ions are reduced to chloride ions and the reducing agent is oxidized. The oxidized reducing agent is separated from the water containing chloride ions and the oxidized reducing agent is regenerated and reused in the reduction of the perchlorate ions.

31 Claims, 4 Drawing Sheets

PROCESS FOR REDUCING PERCHLORATE IN WATER

BACKGROUND OF THE INVENTION

Drinking water or potable water must be of a sufficiently high quality such that consumption of the water does not pose serious risks. One type of contaminant often found in groundwater is perchlorate salts. Perchlorate salts are generated as a by-product from rocket fuels and other explosives. Some perchlorate salts also occur naturally in the environment. Over time, the perchlorate salts each into the groundwater supply. Perchlorate salts dissolve into a cation and a corresponding perchlorate anion, $ClO_4^-$, which is particularly toxic to humans. Several reports suggest that ingestion of $ClO_4^-$ inhibits normal function of the thyroid gland and contributes to hormonal imbalances. Recently, the U.S. Environmental Protection Agency (EPA) determined that $ClO_4^-$ must be regulated as a water contaminant under the Safe Drinking Water Act (SDWA). Further, several states have independently enacted drinking water standards for $ClO_4^-$. Accordingly, there is considerable interest in effectively and efficiently removing $ClO_4^-$ from drinking and potable water sources.

One method of removing $ClO_4^-$ from drinking and potable water sources is through selective ion exchange. In this process, the water is directed through a strong base anion exchange resin and the $ClO_4^-$ in the water binds to the resin. Over time, the resin becomes saturated with $ClO_4^-$ and the resin needs to be regenerated. Because the $ClO_4^-$ binds very tightly to the strong base anion resin, a solution having an extremely high salt concentration, typically between 7-12%, is required to remove the $ClO_4^-$ from the resin. Further, it is difficult to dispose of the brine recovered from regenerating the resin because it is highly concentrated in $ClO_4^-$. Current methods for disposing of the brine include deep well injection. Accordingly, there is a need for an improved method of removing $ClO_4^-$ from water, including brines recovered from resin regeneration, having a high concentration of $ClO_4^-$.

SUMMARY OF THE INVENTION

The present invention relates to a method of removing perchlorate ions from water. Water containing perchlorate ions is mixed with a reducing agent such that the perchlorate ions and the reducing agent undergo an oxidation-reduction reaction. During the oxidation-reduction reaction, perchlorate ions are reduced to chloride ions and the reducing agent is oxidized. The oxidized reducing agent is separated from the water containing chloride ions and the oxidized reducing agent is regenerated and reused in the reduction of perchlorate ions.

Other embodiments of the present invention include filtering and downwardly adjusting the pH of the water containing perchlorate ions prior initiating the oxidation-reduction reaction.

DESCRIPTION OF THE INVENTION

The present invention relates to a process for removing perchlorate ions, $ClO_4^-$, from water. As used herein the term "water" broadly means any water source that contains dissolved $ClO_4^-$, and includes, for example, groundwater and brine recovered as an ion exchange regenerant. However, the process of the present invention may be applied to any aqueous solution containing dissolved $ClO_4^-$. The process of the present invention entails reducing the $ClO_4^-$ in the water into $Cl^-$ ions through an oxidation-reduction reaction. A reducing agent used to reduce the $ClO_4^-$ into $Cl^-$ can be regenerated and reused. Although the embodiments herein describe the reduction of $ClO_4^-$ into $Cl^-$, the process described herein can be adapted to reduce other contaminants, such as nitrate species.

Figure 1:
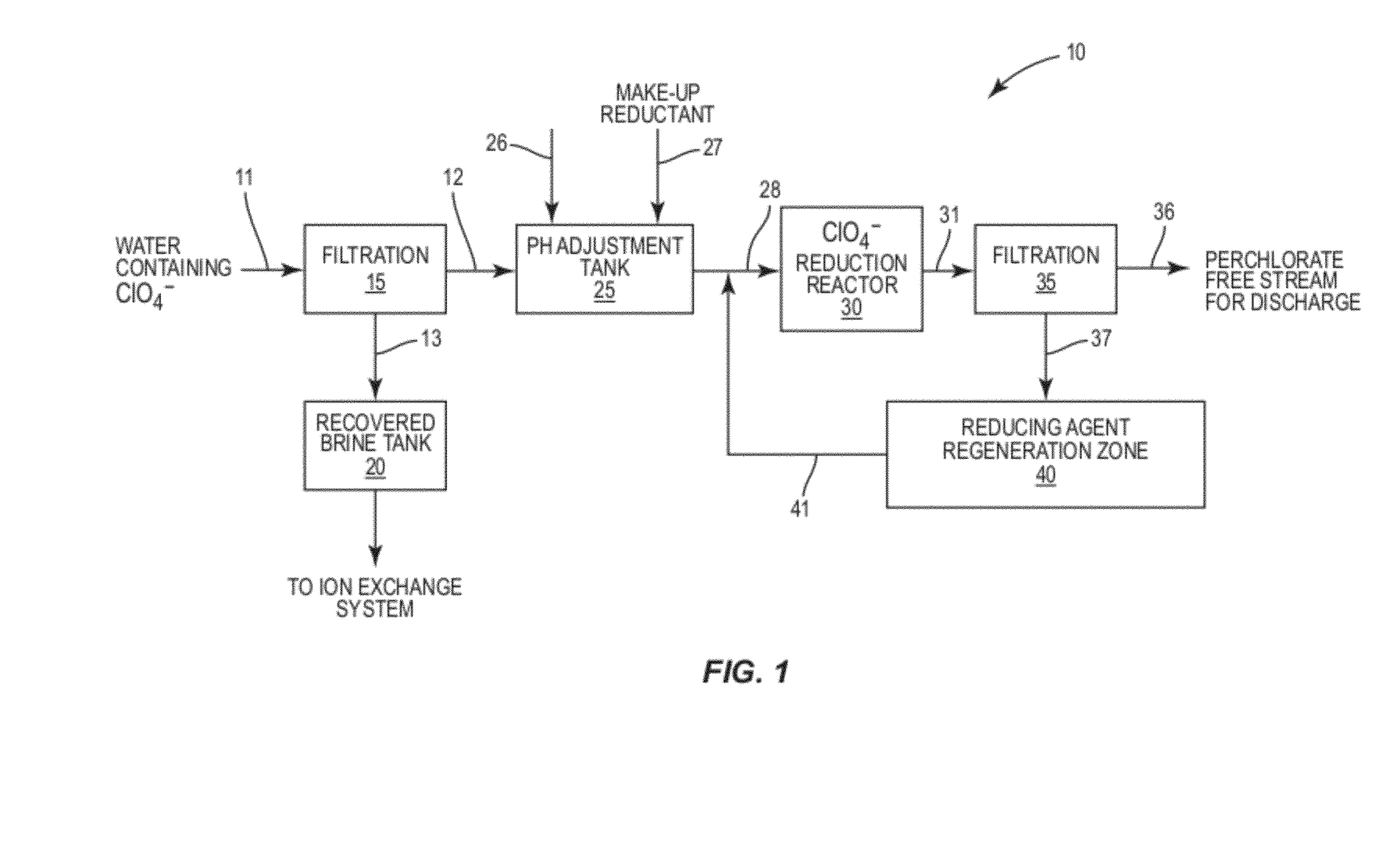
FIG. 1 is a flow diagram illustrating one embodiment of the process for removing perchlorate ions from water according to the present invention.

Referring to FIG. 1, the water treatment system of the present invention is shown therein and generally indicated by the numeral 10. In this embodiment, the system includes a filtration unit 15, a recovery tank 20, a pH adjustment zone 25, an oxidation/reduction reactor 30, a filtration unit 35, and a regeneration zone 40.

As further shown in FIG. 1, the filtration unit 15 includes an inlet 11, a reject line 12 and a filtrate line 13. The filtrate line 13 extends from the filtration unit 15 to the recovery tank 20. The reject line 12 extends between the filtration unit 15 and the pH adjustment zone 25. The pH adjustment zone 25 includes an acid inlet 26 and a make-up reductant inlet 27. A connecting line 28 extends between the pH adjustment zone 25 and the oxidation/reduction reactor 30. A treated water line 31 extends from the oxidation/reduction reactor 30 to the filtration unit 35. A filtrate line 36 and a reject line 37 extend from the filtration unit 35. The filtrate line 36 extends from the filtration unit 35 to a collection area or to a point where the water is subjected to additional treatment. The reject line 37 extends from the filtration lit 35 to the regeneration zone 40. A recycle line 41 operatively connects the regeneration zone 40 to the oxidation/reduction reactor 30. In the embodiment shown in FIG. 1, the recycle line 41 extends from the regeneration zone 40 to a point in the connecting line 28 disposed upstream of the oxidation-reduction reactor 30. However, in another embodiment the recycle line 41 extends directly from the regeneration zone 40 to the oxidation-reduction reactor 30.

Figure 2:
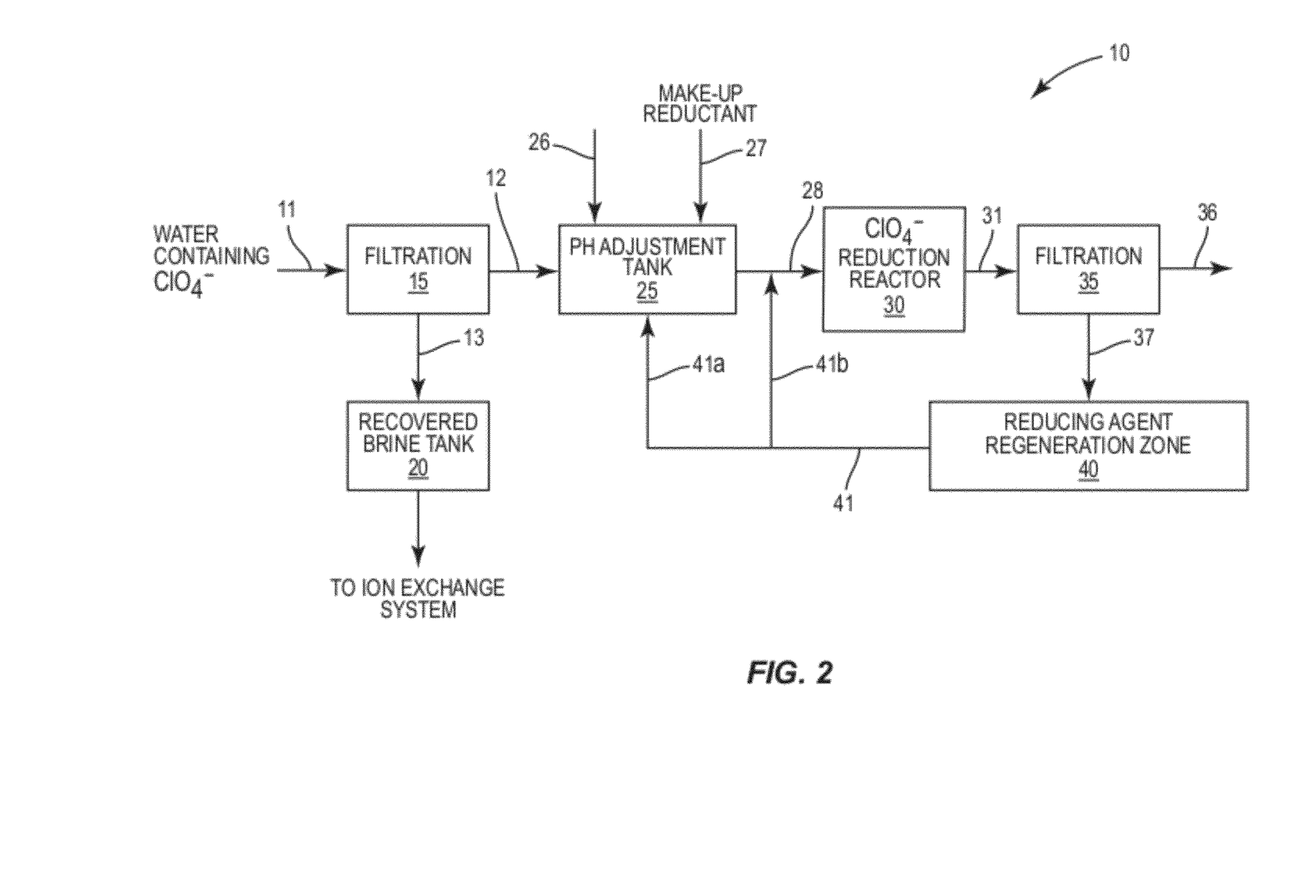
FIG. 2 is a flow diagram of another embodiment of the process for removing perchlorate ions from water according to the present invention.

Referring to FIG. 2, the water treatment system shown therein includes the filtration unit 15, the recovery tank 20, the pH adjustment zone 25, the oxidation/reduction reactor 30, the filtration unit 35, and the regeneration zone 40. However, in this embodiment, the recycle line 41 operatively connects the regeneration zone 40 to the pH adjustment zone 25 and the oxidation/reduction reactor 30. For example, recycle line 41 includes secondary lines 41a and 41b. Line 41a connects recycle line 41 to the pH adjustment zone 25 and line 41b connects the recycle line 41 to the oxidation reduction reactor 30. In the embodiment shown in FIG. 2, the line 41b extends from the recycle line 41 to a point in the connecting line 28 disposed upstream of the oxidation-reduction reactor 30. However, in another embodiment the line 41b extends directly from the recycle line 41 to the oxidation-reduction reactor 30.

Figure 3:
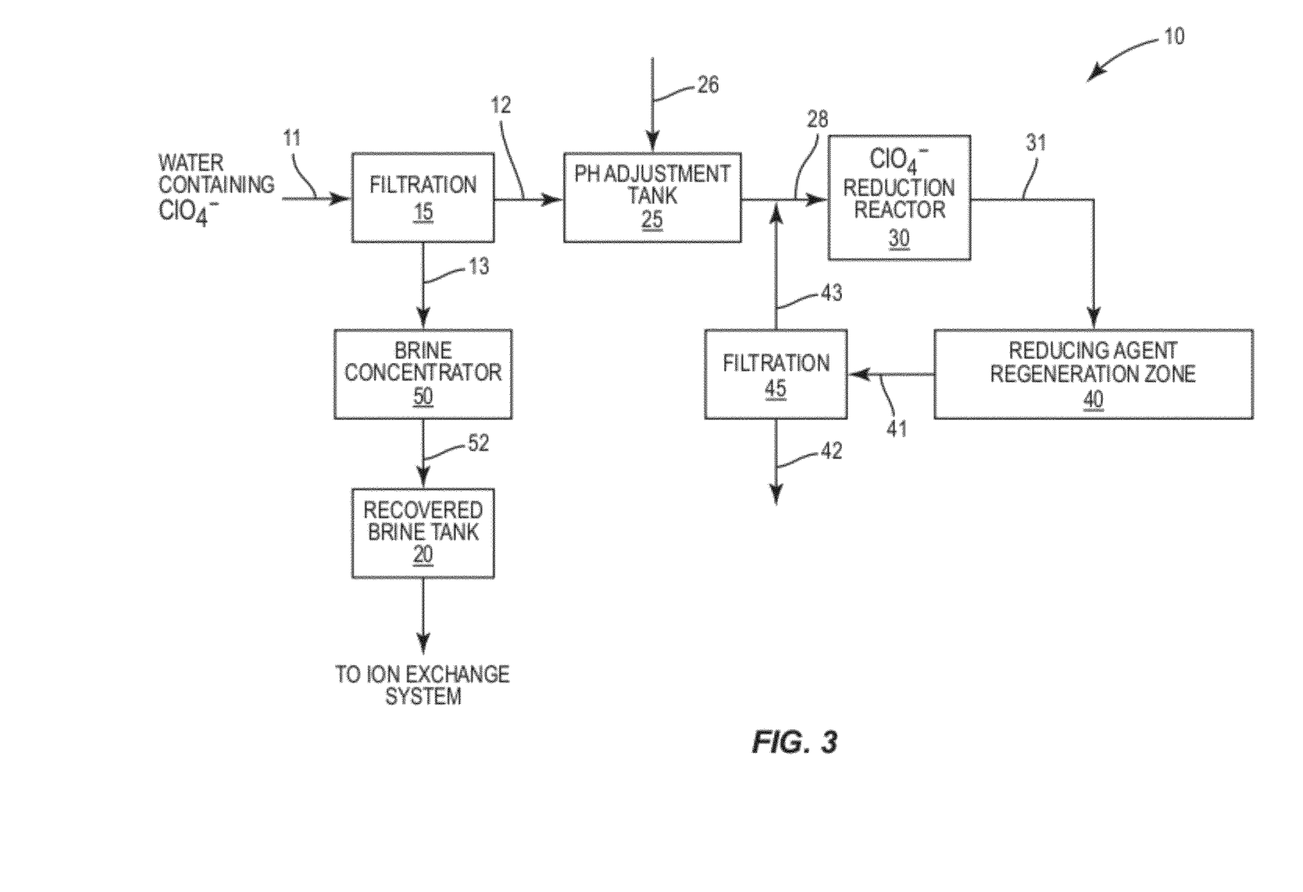
FIG. 3 is a flow diagram of another embodiment of the process for removing perchlorate ions from water according to the present invention.

Referring to FIG. 3, the water treatment system shown therein includes the filtration unit 15, a brine concentrator 50, the recovery tank 20, the pH adjustment zone 25, the oxidation/reduction reactor 30, the regeneration zone 40, and a filtration unit 45. In this embodiment, the filtrate line 13 from the filtration unit 15 extends to the brine concentration 50. The brine concentrator 50 includes an outflow line 52 which extends from the brine concentrator 50 to the recovery tank 20. Further, in the embodiment illustrated in FIG. 3, the treated water line 31 extends directly from the oxidation-reduction reactor 30 to the regeneration zone 40. That is, a filtration unit is not disposed between the oxidation-reduction reactor 30 and the regeneration zone 40. The recycle line 41 extends from the regeneration zone 40 to a filtration unit 45. The filtration unit 45 includes a reject line 43 and a filtrate line 42. The filtrate line 42 extends from the filtration unit 45 to a collection area or to a point where the water is subjected to additional treatment. The reject line 43 extends from the filtration unit 45 to a point in the connecting line 28 disposed upstream of the oxidation-reduction reactor 30. However, in other embodiments the reject line 43 extends from the filtration unit 45 to pH adjustment zone 25 or from the filtration unit 45 to the oxidation-reduction reactor 30.

With reference to the process for removing $ClO_4^-$ from water illustrated in FIG. 1, water containing dissolved $ClO_4^-$ is directed to the filtration unit 15. As shown in FIG. 1, the water in this embodiment, for example, is brine containing $ClO_4^-$ recovered from regenerating an ion exchange unit. However, in other embodiments, the water can be any water stream containing $ClO_4^-$. The filtration unit 15, which in one embodiment is a nanofilter, separates most of the $ClO_4^-$ from the water and produces a reject stream and a filtrate stream. The reject stream is a solution having substantially higher concentration of $ClO_4^-$ than the filtrate stream. In one embodiment, the reject stream comprises between approximately 90% and approximately 95% by volume of $ClO_4^-$ and between approximately 5% and approximately 10% by volume of brine and other elements.

The filtrate is directed from the filtration unit 15 to the recovery tank 20 through filtrate line 13. In some embodiments, the filtrate is recirculated from the recovery tank 20 back to an ion-exchange unit and treated therein. Typically, the filtrate in the recovery tank 20 is directed to an ion-exchange unit when the influent water directed into the filtration unit 15 is brine recovered from regenerating an ion exchange resin. In another embodiment, the filtrate is not directed to the recovery tank 20, but rather is directly recirculated to the ion-exchange unit. In yet another embodiment, the filtrate is directed to the recovery tank 20 and recirculated to a point upstream from the filtration unit 15 and mixed with the influent water containing $ClO_4^-$ prior to the water being filtered in the filtration unit 15. Alternatively, the filtrate can be directed to the recovery tank 20 and subsequently discharged therefrom.

The reject stream having a relatively high concentration of $ClO_4^-$ is directed from the filtration unit 15, through the reject line 12, to the pH adjustment zone 25. Upon exiting the filtration unit 15, the pH of the reject stream is typically between approximately 7 and approximately 3. However, the pH of the reject stream varies depending on the salt concentration thereof. It is noted that the lower the pH of the reject stream, the faster the reduction reaction of $ClO_4^-$ ions into $Cl^-$ ions occurs in the downstream oxidation-reduction reactor 30. Thus, in the pH adjustment zone 25, an acidic solution is added to the reject stream in the pH adjustment zone 25 through inlet 26 and decreases the pH of the reject stream to a desired value. The acidic solution may comprise any acid, such as, sulfuric acid. However, any other acidic solution can be used to decrease the pH of the reject stream.

In one embodiment, it is desired to decrease the pH of the reject stream in the pH adjustment zone 25 to approximately 4. At this pH the subsequent reduction reaction of $ClO_4^-$ in the oxidation-reduction reactor 30 proceeds slowly with some reduction of $ClO_4^-$ occurring after approximately 4 hours. In another embodiment, it is desired to decrease the pH of the reject stream in the pH adjustment zone 25 to approximately 1 or below. When the pH of the reject stream is lowered to approximately 1, the reduction reaction of $ClO_4^-$ in the oxidation-reduction reactor 30 proceeds very quickly, with approximately 99.99% reduction of $ClO_4^-$ occurring within hour 1. However, practical considerations, such as corrosion and costs may impose a limit on the pH reduction. Thus, in other embodiments, it is desired to decrease the pH of the reject stream in the pH adjustment zone 25 to approximately 2.

The pH adjustment zone 25 may also include a pH monitor (not shown) that monitors the pH of the reject stream in the pH adjustment zone 25 either periodically or continuously. The pH monitor may provide a signal to alert the system operator to adjust the pH of the water in the pH adjustment zone 25. Alternatively, the pH monitor may be coupled to a controller that is configured to adjust the flow of the acidic solution through inlet 26 to decrease the pH of the reject stream in the pH adjustment zone 25 to the desired value.

In the embodiment shown in FIG. 1, the pH adjusted reject stream is directed from the pH adjustment zone 25, through connecting line 28, to the oxidation-reduction reactor 30. In one embodiment the oxidation-reduction reactor 30 comprises a vertical tube mixer such as the TURBOMIX™ reactor marketed by Veolia Water, a continuous stirred tank reactor (CSTR), a fixed bed reactor (FBR), or a standard kettle reactor. In one embodiment, the oxidation-reduction reactor 30 is a standard kettle reactor operated as a batch system. In another embodiment, the oxidation-reduction reactor 30 is a CSTR operated as a continuous system.

Once the pH adjusted reject stream is directed into the oxidation-reduction reactor 30, it is mixed with a reducing agent. The reducing agent reduces the $ClO_4^-$ into $Cl^-$ ions and the reducing agent becomes oxidized. In one embodiment, the reducing agent is Ti(III) and is supplied to the pH adjusted reject stream in the form of titanium sulfate, $Ti_2(SO_4)_3$. When Ti (III) is used as the reducing agent to reduce $ClO_4^-$ into $Cl^-$, the Ti(III) is oxidized into Ti(III). However, other reducing agents may also be used in the present invention. Examples of other suitable reducing agents include zero-valent iron ($Fe^0$), ferrous iron ($Fe^{2+}$), manganese on ($Mn2^+$), sodium borohydride ($NaBH_4$), and sodium hydrosulfide (NaHS).

In one embodiment, the pH adjusted reject stream is mixed with the reducing agent in the oxidation-reduction reactor 30 in the presence of a catalyst. The catalyst accelerates the rate of reduction of $ClO_4^-$ into $Cl^-$. When the reduction reaction occurs in the presence of a catalyst, the reaction is referred to as a catalytic reduction. In some embodiments, the catalyst also adsorbs $ClO_4^-$ onto its surface which aids in the reduction reaction. Examples of suitable catalysts used in the present invention include, but are not limited to, titanium oxide ($TiO_2$) and manganese oxide ($MnO_2$).

The equation for reduction reaction of $ClO_4^-$ into $Cl^-$ using Ti(III) as a reducing agent in the presence of a catalyst is shown, in relevant part, below.

$$8\text{Ti(III)} + \text{ClO}_4^- \xrightarrow{\text{catalyst}} 8\text{Ti(IV)} + \text{Cl}^- + 4\text{H}_2\text{O}$$

In some embodiments it is desirable to maintain the above reaction in the oxidation-reduction reactor 30 under anaerobic conditions using, for example, nitrogen gas. In the presence of oxygen, Ti(III) is oxidized into Ti(IV) and thus, presents a competing reaction to the reduction of $\text{ClO}_4^-$ and thus, lowers the efficiency of the reaction.

The temperature in the oxidation-reduction reactor 30 also affects the rate of reduction of $\text{ClO}_4^-$ into $\text{Cl}^-$. The higher the temperature in the oxidation-reduction reactor 30, the faster the reaction proceeds. For example, at ambient temperature, approximately 20° C., the above oxidation-reduction reaction proceeds slowly. However, at temperature of approximately 100° C. and above, the above reaction proceeds much quicker. However, maintaining the oxidation-reduction reactor 30 at a temperature above 100° C. can be costly. Thus, in one embodiment is it desirable, to maintain the temperature in the oxidation-reduction reactor 30 between approximately 80° C. and approximately 100° C. In another embodiment it is preferable to maintain the temperature in the oxidation-reduction reactor 30 between approximately 85° C. and approximately 95° C.

As described above, the reaction in the oxidation-reduction reactor 30 produces a solution containing the oxidized reducing agent and $\text{Cl}^-$ and which is substantially free of $\text{ClO}_4^-$. Often it is desirable for the substantially free $\text{ClO}_4^-$ solution to be compliant with government regulations. For example, in one embodiment, the substantially free $\text{ClO}_4^-$ solution contains less than approximately 18 ppb of $\text{ClO}_4^-$. In another embodiment, the substantially free $\text{ClO}_4^-$ solution contains less than approximately 4 ppb of $\text{ClO}_4^-$.

In some embodiments, excess reducing agent is added to the oxidation-reduction reactor 30 and is not used in the oxidation-reduction reaction. In such situations, the substantially free $\text{ClO}_4^-$ solution produced in the oxidation-reduction reactor 30 contains a mixture of the reducing agent, oxidized reducing agent and $\text{Cl}^-$. For example, if Ti(III) is used as the reducing agent, the solution produced by the oxidation-reduction reactor 30 contains Ti(III)/Ti(IV) and $\text{Cl}^-$.

In the embodiment illustrated in FIG. 1, the substantially free $\text{ClO}_4^-$ solution produced by the reaction in the oxidation-reduction reactor 30 is directed to the filtration unit 35. The filtration unit 35 separates a filtrate containing the $\text{Cl}^-$ ions from a reject stream containing the oxidized reducing agent. Again, if the reducing agent used in the oxidation-reduction reactor 30 is Ti(III), the reject stream from the filtration unit 35 will contain Ti(IV). In one embodiment, the filtration unit 30 is a nanofilter. However, in other embodiments, the filtration unit 35 is a filter having larger pores than a nanofilter, such as an ultrafilter or a microfilter. For example, if the oxidized reducing agent is a chemical having a larger ionic radius than that of Ti(IV), any filter capable of rejecting the oxidized reducing agent may be selected.

The filtrate containing the $\text{Cl}^-$ is directed from the filtration unit 35 through filtrate line 36 to a collection area or to a point where the solution is subjected to additional treatment. In one embodiment, the filtrate is directed to an ion-exchange system for reuse. The reject stream containing the oxidized reducing agent is directed from the filtration unit 35 to the regeneration zone 40 through reject line 37.

In the regeneration zone 40, the spent reducing agent, i.e. oxidized reducing agent, is regenerated into its original form through a reduction reaction. For example, if Ti(III) is used as the reducing agent in the oxidation-reduction reactor 30, Ti(III) is converted into Ti(IV) during the reaction. In the regeneration zone 40, the reject stream containing Ti(IV) is converted back into Ti(III). In one embodiment, the regeneration zone 40 comprises a chemical regeneration unit. In this embodiment, a reducing agent such as sodium borohydride ($\text{NaBH}_4$) or sodium hydrosulfide (NaHS) is mixed with the solution containing the oxidized reducing agent in the regeneration zone 40. The reducing agent functions to regenerate the oxidized reducing agent through a reduction reaction. In another embodiment, the regeneration zone 40 comprises an electrolytic regeneration cell having a cathode and an anode. In an electrolytic regeneration cell, voltage is applied between the anode and the cathode so as to positively charge the anode and negatively charge the cathode. Under these conditions, oxidation of water ($\text{H}_2\text{O}$) into $\text{O}_2$ occurs at the surface of the anode while reduction of the oxidized reducing agent occurs at the surface of the cathode.

After the reducing agent has been regenerated in the regeneration zone 40, the solution containing the regenerated reducing agent is directed from the regeneration zone 40 to the oxidation-reduction reactor 30 through recycle line 41. In the embodiment shown in FIG. 1, the recycle line 41 extends from the regeneration zone 40 to a point in the connecting line 28 disposed upstream of the oxidation-reduction reactor 30. However, in another embodiment the recycle line 41 extends directly from the regeneration zone 40 to the oxidation-reduction reactor 30. In either case, the regenerated reducing agent is mixed with the solution containing $\text{ClO}_4^-$ in the oxidation-reduction reactor 30 and used to reduce the $\text{ClO}_4^-$ in the solution into $\text{Cl}^-$.

With reference to the process for removing $\text{ClO}_4^-$ from water illustrated in FIG. 2, the pH of the reject stream produced by the filtration unit 15 and disposed in the pH adjustment zone can be controlled in a number of ways. Similar to the embodiment illustrated in FIG. 1, the pH of the reject stream can be controlled by mixing the reject stream with an acidic solution through inlet 26 in the pH adjustment zone 25. As described above, the acidic solution may include sulfuric acid. However, the pH of the reject stream can also be controlled by mixing the reject stream from the filtration unit 15 with an acidic reducing agent. As shown in FIG. 2, an acidic reducing agent can be directly added to the reject stream in the pH adjustment zone through make-up reductant inlet 27. Further, the regenerated reducing agent can be directed from the regeneration zone 40 to the pH adjustment zone 25 through lines 41 and 41a. For, example, in one embodiment, the reducing agent used in the oxidation-reduction reactor 30 is Ti(III), and is supplied in the form of acidic $\text{Ti}_2(\text{SO}_4)_3$. Once the reducing agent is regenerated in the regeneration zone 40, the solution containing the regenerated Ti(III) is recirculated from the regeneration zone 40 to the pH adjustment zone 25 and is mixed with the reject stream therein. In this embodiment, the recirculated solution containing regenerated reducing agent is acidic and can lower the pH of the reject stream in the pH adjustment zone 25. When using the recirculated solution from the regeneration zone 40 to lower the pH of the reject stream, another acid source may be required to lower the pH of the solution to a desired value. Accordingly, an additional acidic solution can be added to the reject stream through inlet 26.

The embodiment shown in FIG. 2 also permits the solution containing the regenerated reducing agent to be directed from the regeneration zone 40 to the oxidation-reduction reactor 30 through lines 41 and 41b. In this particular embodiment, the solution containing the regenerated reducing agent is directed from the regeneration zone 40 to a point in the connecting line 28 disposed upstream from the oxidation-reduction reactor 30. In another embodiment, the solution containing the regenerated reducing agent is directed from the regeneration zone 40 directly to the oxidation-reduction reactor 30. In either case, the regenerated reducing agent is mixed with the solution containing $ClO_4^-$ in the oxidation-reduction reactor 30 and used to reduce the $ClO_4^-$ in the solution into $Cl^-$.

With reference to the process for removing $ClO_4^-$ from water illustrated in FIG. 3, the filtrate produced in the filtration unit 15 is directed to a brine concentrator 50 through filtrate line 13. In one embodiment, the brine concentrator 50 is an evaporator and concentrates the filtrate. The concentrated filtrate is directed to the recovery tank 20 through outflow line 52. In one embodiment, the concentrated filtrate in the recovery tank 20 is directed to an ion-exchange unit and treated therein. Typically, the concentrated filtrate in the recovery tank 20 is directed to an ion-exchange unit when the influent water directed into the filtration unit 15 is brine recovered from regenerating an ion exchange resin. In another embodiment, the concentrated filtrate is not directed to the recovery tank 20, but rather is directly recirculated to the ion-exchange unit. In yet another embodiment, the concentrated filtrate is directed to the recovery tank 20 and recirculated to a point upstream from the filtration unit 15 and mixed with the influent water containing $ClO_4^-$ prior to the water being filtered in the filtration unit 15. Alternatively, the concentrated filtrate can be directed to the recovery tank 20 and subsequently discharged therefrom.

The embodiment illustrated in FIG. 3 also includes a filtration unit 45 disposed downstream from the regeneration zone 40. As shown in FIG. 3, the solution containing the regenerated reducing agent is directed from the regeneration zone 40 to the filtration unit 45 through outflow line 41. The filtration unit 45 separates the regenerated reducing agent from other salts in the solution. Filtrate produced by the filtration unit 45, which generally contains monovalent ions, is directed to a collection area or to a point where the water is subjected to additional treatment. The reject stream produced by the filtration unit 45 has a relatively high concentration of the regenerated reducing agent. In one embodiment the filtration unit 45 comprises a nanofilter. However, in other embodiments, the filtration unit 45 is a filter having larger pores than a nanofilter, such as an ultrafilter or a microfilter. For example, if the regenerated reducing agent is a chemical having a larger ionic radius than that of Ti(III), any filter capable of rejecting the regenerated reducing agent may be selected.

In the embodiment shown in FIG. 3, the reject stream is directed from the filtration unit 45, through reject line 43, to a point in the connecting line 28 disposed upstream of the oxidation-reduction reactor 30. However, in another embodiment the reject line 43 extends directly from the filtration unit 45 to the oxidation-reduction reactor 30. In either case, the reject stream containing the regenerated reducing agent is mixed with the solution containing $ClO_4^-$ in the oxidation-reduction reactor 30 and used to reduce the $ClO_4^-$ in the solution into $Cl^-$.

Notably, the embodiment illustrated in FIG. 3 includes three filtration units, 15, 35, and 45. However, in another embodiment, the system may only include two filtration units.

Appearing in Table 1 below is a summary of exemplary data obtained for one example reduction reaction of $ClO_4^-$ into $Cl^-$. In this example, 15 mg/l of $ClO_4^-$ was mixed with an aqueous solution in a reaction chamber. A solution having a Ti(III) concentration of 5580 mg/l was added to the reaction chamber and used as the reducing agent. The Ti(III) solution was formed from the addition of titanium sulfate ($Ti_2(SO_4)_3$) to an aqueous solution. A solution having a $TiO_2$ concentration of 300 mg/l was also added to the reaction chamber and used as the catalyst. The initial pH of the aqueous solution was 0.64. The reaction took place under a 380 ml/min nitrogen gas flow. The reaction was conducted under reduction conditions by maintaining a negative oxidation reduction potential (ORP) value. Maintaining a negative ORP increases the likelihood for the reduction of $ClO_4^-$ to occur. Using an ORP probe, the values were monitored and recorded. During the reaction, the dissolved oxygen (DO) concentration in the sample ranged between 0.7 and 0.8 mg/l which revealed that the reaction was carried out under reasonably reduced conditions.

Figure 4:
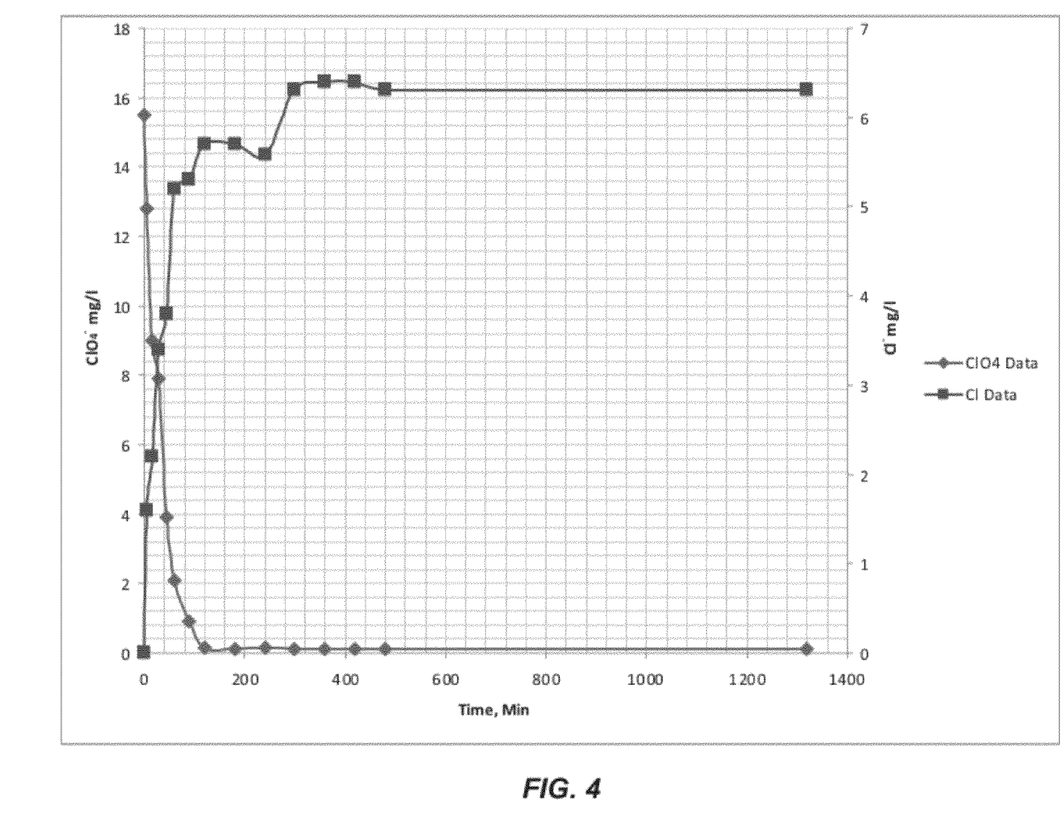
FIG. 4 is a line graph illustrating the reduction of perchlorate ions into chloride ions over time during an exemplary reaction of the present invention.

Under the above conditions, $ClO_4^-$ eras reduced from 15 mg/l to less than 0.1 mg/l after approximately 5 hours. Further, for this example, the minimum detection limit (MDL) for the $ClO_4^-$ analytical instrument was less than 0.1 mg/l. A mass balance calculation revealed that more than 99.9% of $ClO_4^-$ was reduced into $Cl^-$. Table 1 also illustrates that the Ti(III) present in the solution decreased over time as the Ti(III) was oxidized into Ti(IV). Further, Table 1 illustrates that the amount of $Cl^-$ increased as the amount of $ClO_4^-$ decreased. FIG. 4 is a line graph illustrating the data provided in Table 1. The line graph clearly illustrates the increase in $Cl^-$ and the decrease in $ClO_4^-$ over

TABLE 1

| Time (min) | ORP (mv) | Ti(III) (mg/l) | $ClO_4^-$ (mg/l) | $Cl^-$ (mg/l) | Temperature (° C.) |
|---|---|---|---|---|---|
| 0 | 74.1 | 5520 | 15.5 | 0.0 | 84.7 |
| 5 | −2.1 | 5520 | 12.8 | 1.6 | 85.2 |
| 15 | −5 | 5520 | 9.0 | 2.2 | 84.9 |
| 30 | −5.4 | 5520 | 7.9 | 3.4 | 86.4 |
| 45 | −6.8 | 5400 | 3.9 | 3.8 | 88.8 |
| 60 | −6.3 | 5400 | 2.1 | 5.2 | 90.8 |
| 90 | −8.4 | 5400 | 0.91 | 5.3 | 90.7 |
| 120 | −8.6 | 5400 | 0.16 | 5.7 | 90.9 |
| 180 | −6.8 | 5040 | 0.13 | 5.7 | 88.7 |
| 240 | −8.7 | 5040 | 0.15 | 5.58 | 89.2 |
| 300 | −10.4 | 5040 | <0.1 | 6.3 | 89.9 |
| 360 | −9.5 | 4800 | <0.1 | 6.4 | 89.8 |
| 420 | −10.2 | 4800 | <0.1 | 6.4 | 89.9 |
| 480 | −7.4 | 4800 | <0.1 | 6.3 | 90.2 |
| 1320 | −7.6 | 3790 | <0.1 | 6.3 | 90.6 |

Table 2 provides data obtained for another example reduction reaction of $ClO_4^-$ into $Cl^-$. In this example, 15 mg/l of $ClO_4^-$ was mixed with an aqueous solution in a reaction chamber. A solution having a Ti(IIII) concentration of 3480 mg/l was added to the reaction chamber and used as the reducing agent. The Ti(III) solution was formed from the addition of titanium sulfate ($Ti_2(SO_4)_3$) to an aqueous solution. A solution having a $TiO_2$ concentration of 300 mg/l was also added to the reaction chamber and used as the catalyst. The initial pH of the aqueous solution was 0.82. The reaction took place under a 380 ml/min $N_2$ gas flow. As shown below, $ClO_4^-$ was reduced from 15 mg/l to less than 0.1 mg/l after approximately 7 hours.

TABLE 2

| Time (min) | Ti(III) (mg/l) | $ClO_4^-$ (mg/l) | Temperature (° C.) |
|---|---|---|---|
| 0 | 3480 | 14.70 | 78.4 |
| 5 | 3480 | 12.50 | 80.9 |
| 10 | 3360 | 12.20 | 80.8 |
| 15 | 3240 | 10.75 | 78.3 |
| 30 | 2880 | 9.95 | 82.3 |

TABLE 2-continued

| Time (min) | Ti(III) (mg/l) | ClO$_4^-$ (mg/l) | Temperature (° C.) |
|---|---|---|---|
| 45 | 2880 | 8.30 | 83 |
| 60 | 2880 | 7.10 | 83.2 |
| 90 | 2880 | 5.00 | 84.2 |
| 120 | 2736 | 4.05 | 84.6 |
| 180 | 2640 | 2.85 | 83.8 |
| 240 | 2640 | 1.80 | 84.1 |
| 300 | 2520 | 1.10 | 84.4 |
| 360 | 2520 | 0.19 | 83.4 |
| 420 | 1920 | <0.10 | 85.6 |
| 1200 | 1248 | <0.10 | 83.4 |

Appearing in Table 3 below is a summary of exemplary data obtained for another example reduction reaction of ClO$_4^-$ into Cl$^-$. In this example, 15.2 mg/l of ClO$_4^-$ was mixed with a 3% aqueous solution of NaCl in a reaction chamber. A solution having a TOW) concentration of 5580 mg/l was added to the reaction chamber and used as the reducing agent. The Ti(III) solution was formed from the addition of titanium sulfate (Ti$_2$(SO$_4$)$_3$) to an aqueous solution. A solution having a TiO$_2$ concentration of 300 mg/l was also added to the reaction chamber and used as the catalyst. The initial pH of the aqueous solution was 0.87. The reaction took place under a 380 ml/min nitrogen gas flow. Under these conditions, ClO$_4^-$ was reduced from 15.2 mg/l to less than 0.1 mg/l after approximately 3 hours. Additional data points for the reduction of ClO$_4^-$ in this example are shown in Table 3 below.

TABLE 3

| Time (min) | ORP (mv) | Ti(III) (mg/l) | ClO$_4^-$ (mg/l) | Temperature (° C.) |
|---|---|---|---|---|
| 0 | 385 | 5580 | 15.2 | 89.5 |
| 5 | 10.7 | 5520 | 6.6 | 86.1 |
| 15 | −26.2 | 5520 | 5.2 | 86.5 |
| 30 | 14 | 5520 | 3.9 | 88.5 |
| 45 | 12.7 | 5520 | 2.2 | 90.3 |
| 60 | 8.3 | 5400 | 0.82 | 91.1 |
| 120 | 15.8 | 5400 | 0.58 | 90.6 |
| 180 | 14.2 | 5400 | 0.31 | 90.8 |
| 1170 | −12.3 | 4200 | <0.1 | 88.3 |

Appearing in Table 4 below is a summary of exemplary data obtained for another example reduction reaction of ClO$_4^-$ into Cl$^-$. In this example, 14.6 mg/l of ClO$_4^-$ was mixed with a 3% aqueous solution of brine in a reaction chamber. A solution having a Ti(IIII) concentration of 3400 mg/l was added to the reaction chamber and used as the reducing agent. The Ti(III) solution was formed from the addition of (Ti$_2$(SO$_4$)$_3$) to an aqueous solution. A solution having a MnO$_2$ concentration of 300 mg/l was also added to the reaction chamber and used as the catalyst. The initial pH of the ClO$_4^-$ solution was 072. The reaction took place under a 380 ml/min nitrogen gas flow. Under these conditions, ClO$_4^-$ was reduced from 14.6 mg/l to less than 0.1 mg/l after approximately 7 hours. Additional data points for the reduction of ClO$_4^-$ in this example are shown in Table 4 below. Note that the results using TiO$_2$ as the catalyst shown in Table 2 are quite similar to the results using MnO$_2$ as the catalyst in Table 4.

TABLE 4

| Time (min) | ORP (mv) | Ti(III) (mg/l) | ClO$_4^-$ (mg/l) | Temperature (° C.) |
|---|---|---|---|---|
| 0 | 43.8 | 3552 | 14.6 | 77.5 |
| 5 | −120.5 | 3552 | 12.5 | 78.4 |
| 10 | −120 | 3120 | 12.2 | 81.5 |
| 15 | −101.3 | 3120 | 10.75 | 82.6 |
| 30 | −114.8 | 3000 | 9.95 | 86.3 |
| 45 | −91.4 | 3000 | 8.3 | 86.2 |
| 60 | −97.7 | 2880 | 7.1 | 84.7 |
| 90 | −110.2 | 2640 | 5.0 | 82.9 |
| 120 | −113.63 | 2640 | 4.05 | 83.9 |
| 180 | −102.2 | 2640 | 2.85 | 86.1 |
| 240 | −112.2 | 2400 | 1.8 | 84.8 |
| 300 | −117.4 | 2280 | 1.1 | 83.4 |
| 360 | −116.2 | 2160 | 0.19 | 83.4 |
| 420 | −119.7 | 2160 | <0.1 | 83.6 |
| 1200 | −123.6 | 1320 | <0.1 | 85.0 |

Appearing in Table 5 below is a summary of exemplary data obtained for another example reduction reaction of ClO$_4^-$ into Cl$^-$. In this example, ClO$_4^-$ was reduced into Cl$^-$ in the presence of a catalyst in a fixed bed reactor system under reduced atmosphere. A 1 inch diameter column was used as the fixed bed reactor and was filled to approximately 8" from the bottom with MnO$_2$ coated granular activated carbon which served as the catalyst. A solution having a ClO$_4^-$ concentration of 18.4 mg/l (18,400 ppb) and containing 3% brine and a solution having a Ti$_2$(SO$_4$)$_3$ concentration of 5500 mg/l were separately pumped through the column. The initial pH of the ClO$_4^-$/brine solution was 1.0. The reaction in the column took place under a 380 ml/ruin nitrogen gas flow. The column was operated in a down flow mode at a temperature of between approximately 85° C. and 90° C. After 90 minutes, samples were collected from the column and the ClO$_4^-$ concentration was measured in each sample. As shown in the Table 5 below, substantially all ClO$_4^-$ was reduced during the 90 minute contact time. In this example, the MDL for the ClO$_4$ analytical instrument was less than 4 ppb. Further, t is noted that at sample number 4, the ClO$_4^-$ concentration in the effluent increased. This increase in ClO$_4^-$ concentration is attributed to the increased oxidation of the reducing agent. Once the reducing agent is oxidized it is no longer effective in reducing ClO$_4^-$. The volume of each sample processed and the ClO$_4^-$ in the treated effluent are shown in Table 5 below. Note that 1 Bed Volume=100 ml.

TABLE 5

| Sample Number | Bed Volume Processed | ClO$_4^-$ (ppb) in treated effluent |
|---|---|---|
| 1 | 3 | <4 |
| 2 | 5 | <4 |
| 3 | 7 | <4 |
| 4 | 10 | 4 |
| 5 | 12 | 10 |

In the discussion of the various systems and processes discussed above, a number of filtration units such as filtration units 15, 35 and 45 have been referred to. The filtration units can include various types of filtering devices such as membrane separators and other known filtration devices capable of performing the described filtration processes.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method of treating water having perchlorate ions comprising:
    a. directing the water through an ion exchange resin, wherein the ion exchange resin removes the perchlorate ions from the water;
    b. regenerating the ion exchange resin with a brine to produce a regenerated ion exchange resin and a brine having perchlorate ions;
    c. treating the brine having perchlorate ions with a filter and filtering the brine to produce a brine filtrate and a reject stream, wherein the reject stream has a perchlorate ion concentration that is higher than the perchlorate concentration of the brine filtrate;
    d. mixing a reducing agent with the reject stream in the presence of manganese dioxide to initiate an oxidation-reduction reaction wherein the perchlorate ions are reduced to chloride ions and the reducing agent is oxidized into an oxidized reducing agent, the oxidation-reduction reaction producing water containing the chloride ions and the oxidized reducing agent;
    e. separating the oxidized reducing agent from the chloride ions;
    f. regenerating the oxidized reducing agent to form a regenerated reducing agent and mixing the regenerated reducing agent with the reject stream containing perchlorate ions; and
    g. recycling the brine filtrate to the ion exchange resin to regenerate the ion exchange resin.

2. The method of claim 1 wherein filtering the brine through the filter comprises filtering the brine through a nanofilter.

3. The method of claim 1 wherein the reject stream is between approximately 90% and approximately 95% by volume of perchlorate ions.

4. The method of claim 1 further comprising adjusting the pH of the reject stream containing perchlorate ions downwardly prior to mixing the reject stream with the reducing agent.

5. The method of claim 4 wherein adjusting the pH of the reject stream comprises adjusting the pH of the reject stream to below 2.

6. The method of claim 5 wherein adjusting the pH of the reject stream comprises adjusting the pH of the reject stream to below 1.

7. The method of claim 4 wherein adjusting the pH of the reject stream containing perchlorate ions downwardly comprises injecting an acidic solution into the reject stream containing perchlorate ions.

8. The method of claim 7 wherein the acidic solution includes the regenerated reducing agent.

9. The method of claim 1 wherein the reducing agent is selected from the group consisting of Ti(III), zero-valent iron ($Fe^0$), ferrous iron ($Fe^{2+}$), manganese ion ($Mn^{2+}$), sodium borohydride ($NaBH_4$), and sodium hydrosulfide (NaHS).

10. The method of claim 9 wherein the reducing agent is Ti(III) and the oxidized reducing agent is Ti(IV).

11. The method of claim 1 wherein mixing the reject stream containing perchlorate ions with a reducing agent occurs under anaerobic conditions.

12. The method of claim 1 wherein mixing the reject stream containing perchlorate ions with a reducing agent occurs at a temperature of above approximately 85° C.

13. The method of claim 12 wherein mixing the reject stream containing perchlorate ions with a reducing agent occurs at a temperature of above approximately 95° C.

14. The method of claim 1 wherein the reject stream containing the chloride ions and the oxidized reducing agent has a concentration of perchlorate ions less than approximately 18 ppb.

15. The method of claim 14 wherein the water containing the chloride ions and the oxidized reducing agent has a concentration of perchlorate ions less than approximately 4 ppb.

16. The method of claim 1 wherein separating the oxidized reducing agent from the chloride ions comprises filtering the water containing the chloride ions and the oxidized reducing agent through a nanofilter.

17. The method of claim 1 further comprising:
    a. adjusting the pH of the reject stream downwardly to produce a pH adjusted reject stream; and
    b. wherein separating the oxidized reducing agent from the chloride ions comprises filtering the water containing the chloride ions and the oxidized reducing agent through a nanofilter.

18. The method of claim 1 wherein separating the oxidized reducing agent from the chloride ions comprises filtering the water containing the chloride ions and the oxidized reducing agent and producing a filtrate stream containing the chloride ions, and wherein the method further comprises directing the filtrate stream containing chloride ions to an ion-exchange unit.

19. The method of claim 1 wherein the reducing agent is a first reducing agent and wherein regenerating the oxidized reducing agent comprises mixing the oxidized reducing agent with a second reducing agent.

20. The method of claim 19 wherein the second reducing agent is sodium borohydride ($NaBH_4$) or sodium hydrosulfide (NaHS).

21. The method of claim 1 wherein regenerating the oxidized reducing agent comprises: directing the oxidized reducing agent to an electrolytic regeneration cell; applying voltage between an anode and a cathode in the electrolytic regeneration cell; and reducing the oxidized reducing agent at a surface of the cathode.

22. The method of claim 1 wherein regenerating the oxidized reducing agent produces a solution containing the regenerated reducing agent and prior to mixing the regenerated reducing agent with the reject stream containing perchlorate ions the method comprises filtering the solution containing the regenerated reducing agent and producing a second reject stream and a second filtrate stream.

23. A method of treating water having perchlorate ions comprising:
    a. treating the water having perchlorate ions with a first filter and filtering the water to produce a first filtrate and a first reject stream, wherein the first reject stream has a perchlorate ion concentration that is higher than the perchlorate concentration of the first filtrate;
    b. downwardly adjusting the pH of the first reject stream;
    c. mixing a reducing agent with the pH adjusted first reject stream in the presence of manganese dioxide such that the perchlorate ions in the first reject stream are reduced to chloride ions and the reducing agent is oxidized;

d. filtering the first reject stream having the chloride ions and the oxidized reducing agent through a second filter and producing a second reject stream containing the oxidized reducing agent and a second filtrate stream containing the chloride ions; and e. regenerating the oxidized reducing agent and mixing the reducing agent with the pH adjusted first reject stream.

24. The method of claim 23 wherein adjusting the pH of the reject stream comprises adjusting the pH of the reject stream to below 2.

25. The method of claim 23 wherein the reducing agent is Ti(III) and the oxidized reducing agent is Ti(IV) and wherein the step of mixing the reject stream containing perchlorate ions with the reducing agent occurs under anaerobic conditions.

26. The method of claim 23 wherein the reducing agent is a first reducing agent and wherein regenerating the oxidized reducing agent comprises mixing the oxidized reducing agent with a second reducing agent.

27. The method of claim 23 wherein regenerating the oxidized reducing agent comprises: directing the oxidized reducing agent to an electrolytic regeneration cell; applying voltage between an anode and a cathode in the electrolytic regeneration cell; and reducing the oxidized reducing agent at a surface of the cathode.

28. A method of removing perchlorate ions from water comprising:
  a. providing an influent water stream containing perchlorate ions;
  b. concentrating the influent water stream in a filtering device and producing a first reject stream and a product stream, where the first reject stream contains a concentration of perchlorate ions and has a pH greater than 4;
  c. downwardly adjusting the pH of the first reject stream to at least approximately 2;
  d. mixing a reducing agent with the pH adjusted first reject stream in the presence of manganese dioxide such that the perchlorate ions in the pH adjusted first reject stream are reduced to chloride ions and the reducing agent is oxidized;
  e. after mixing the reducing agent with the pH adjusted first reject stream, filtering the pH adjusted first reject stream and producing a second reject stream and a filtrate stream, the second reject stream containing the oxidized reducing agent and the filtrate stream containing the chloride ions;
  f. directing the second reject stream to a regeneration zone and regenerating the oxidized reducing agent in the second reject stream; and
  g. mixing the regenerated reducing agent with the pH adjusted first reject stream.

29. The method of claim 28 including concentrating the influent water stream by passing the influent water stream through a first membrane separator; and wherein filtering the pH adjusted first reject stream includes passing the pH adjusted first reject stream through a second membrane separator to produce the second reject stream and the filtrate stream.

30. The method of claim 28 wherein the reducing agent is selected from the group consisting of Ti(III), zero-valent iron ($Fe^0$), ferrous iron ($Fe^{2+}$), manganese ion ($Mn^{2+}$), sodium borohydride ($NaBH_4$), and sodium hydrosulfide (NaHS).

31. The method of claim 30 wherein the reducing agent is Ti(III) and the oxidized reducing agent is Ti(IV).

* * * * *